(12) United States Patent
Gaessler et al.

(10) Patent No.: US 7,134,410 B2
(45) Date of Patent: Nov. 14, 2006

(54) DETACHABLE CONNECTION FOR COUPLING A GAS EXCHANGE VALVE OF AN INTERNAL COMBUSTION ENGINE TO AN ACTUATOR

(75) Inventors: Hermann Gaessler, Vaihingen (DE); Udo Diehl, Stuttgart (DE); Karsten Mischker, Leonberg (DE); Rainer Walter, Pleidelsheim (DE); Andreas Baumann, Markgroeningen (DE); Gerhard Filp, Freiberg (DE); Bernd Rosenau, Tamm (DE); Juergen Ulm, Eberdingen (DE); Thomas Mocken, Sersheim (DE); Sevan Tatiyosyan, Sersheim (DE); Juergen Schiemann, Markgroeningen (DE); Christian Grosse, Kornwestheim (DE); Georg Mallebrein, Korntal-Muenchingen (DE); Volker Beuche, Stuttgart (DE); Stefan Reimer, Markgroeningen (DE); Simon Kieser, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 10/399,680

(22) PCT Filed: Jun. 11, 2002

(86) PCT No.: PCT/DE02/02124

§ 371 (c)(1),
(2), (4) Date: Oct. 14, 2003

(87) PCT Pub. No.: WO03/018969

PCT Pub. Date: Mar. 6, 2003

(65) Prior Publication Data

US 2005/0199197 A1    Sep. 15, 2005

(30) Foreign Application Priority Data

Aug. 22, 2001 (DE) .................. 101 41 176

(51) Int. Cl.
*F01L 1/30* (2006.01)
(52) U.S. Cl. .................. 123/90.24; 123/188.5; 123/188.2; 123/90.28; 403/335; 403/359.5
(58) Field of Classification Search ............. 123/90.24, 123/189; 403/335, 359.5, 359.6
See application file for complete search history.

(56) References Cited

U.S. PATENT DOCUMENTS

| | | | | | |
|---|---|---|---|---|---|
| 3,338,228 | A | * | 8/1967 | Giles | 123/188.1 |
| 3,416,771 | A | * | 12/1968 | Updike | 251/337 |
| 3,466,009 | A | * | 9/1969 | Giles | 251/337 |
| 3,793,999 | A | * | 2/1974 | Seiler et al. | 123/90.67 |
| 5,003,940 | A | * | 4/1991 | Hixson | 123/90.54 |
| 5,213,072 | A | * | 5/1993 | Dohring | 123/90.48 |
| 5,231,959 | A | * | 8/1993 | Smietana | 123/90.12 |
| 5,485,815 | A | * | 1/1996 | Shida | 123/188.3 |
| 5,619,961 | A | * | 4/1997 | Diggs | 123/188.13 |
| 6,202,609 | B1 | * | 3/2001 | Metz | 123/90.11 |
| 6,338,325 | B1 | * | 1/2002 | Kobayashi et al. | 123/90.67 |
| 6,688,268 | B1 | * | 2/2004 | Schlembach et al. | 123/90.48 |
| 6,729,287 | B1 | * | 5/2004 | Hammer et al. | 123/90.48 |
| 6,752,116 | B1 | * | 6/2004 | Gaessler et al. | 123/188.3 |

* cited by examiner

Primary Examiner—Thomas Denion
Assistant Examiner—Kyle M. Riddle
(74) Attorney, Agent, or Firm—Ronald E. Greigg

(57) ABSTRACT

Disclosed is a simple, easy-to-produce, and reliable connection between a shaft of a gas exchange valve and an actuator. This connection is detachable and, as a result, can be connected and disconnected multiple times. It is also possible to dispose the coupling piece on the shaft of the gas exchange valve and provide circumferential grooves on the control element of the actuator.

19 Claims, 2 Drawing Sheets

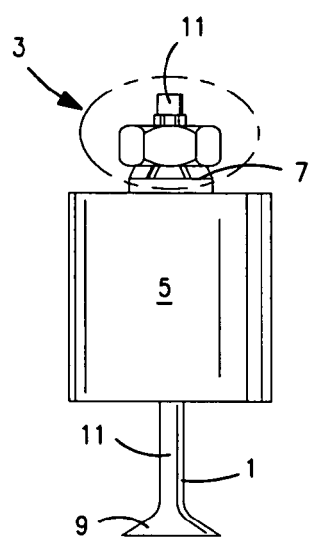
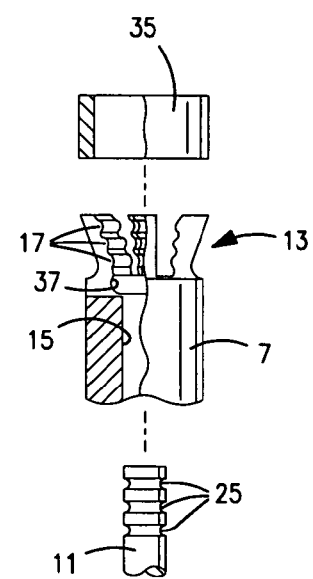
FIG. 2
FIG. 6

DETACHABLE CONNECTION FOR COUPLING A GAS EXCHANGE VALVE OF AN INTERNAL COMBUSTION ENGINE TO AN ACTUATOR

CROSS-REFERENCE TO RELATED APPLICATIONS

This application is a 35 USC 371 application of PCT/DE 02/02124 filed on Jun. 11, 2002.

BACKGROUND OF THE INVENTION

1. Field of the Invention

The invention relates to an improved connection for connecting a gas exchange valve of an internal combustion engine to an actuator.

2. Description of the Prior Art

In internal combustion engines whose gas exchange valves are activated in the conventional manner by way of a camshaft, the activation motion of the camshaft is transmitted to the shaft of the gas exchange valve by way of a bucket tappet, a drag lever, or a rocker, for example, when this gas exchange valve is to be opened. A valve spring clamped between the cylinder head and the gas exchange valve keeps the gas exchange valve in constant contact with the bucket tappet, drag lever, or rocker. In addition, the valve spring serves to close the gas exchange valve.

In modern engine designs, gas exchange valves are no longer activated by way of a camshaft, but rather by actuators such as piezoelectric actuators, hydraulic actuators, or pneumatic actuators, for example. In the context of the invention, the term "actuator" is considered to include all regulating elements capable of performing the opening and closing motions of a gas exchange valve, regardless of their physical operating principles. The actuators open and close the gas exchange valves desmodromically, i.e., forcibly. Therefore, it is necessary to produce a connection between the actuator and the gas exchange valve that can reliably transmit the forces necessary for opening and closing the gas exchange valve.

The object of the invention is therefore to produce a simple, inexpensive, and reliable connection between the gas exchange valve and the actuator. At the same time, it should be possible for the connection to be disconnected and reconnected multiple times and, at the same time, the connection should require only minor changes to the gas exchange valve and the cylinder head of internal combustion engines that are already in series production.

This object is attained according to the invention by a connection of a gas exchange valve of an internal combustion engine to an actuator, having a shaft and a coupling piece in which at least one circumferential groove is provided on the shaft, the coupling piece has a bore whose diameter in the assembled state corresponds to the diameter of the shaft, the bore has at least one circumferential bead that can be connected in a positively engaging fashion to the at least one circumferential groove, and the coupling piece has at least one longitudinal slit in the vicinity of the bead.

SUMMARY OF THE INVENTION

The connection of the gas exchange valve and actuator according to the invention is based on a positive engagement that has the same loading capacity in both activation directions of the actuator (opening and closing the gas exchange valve). Moreover, with the connection according to the invention, it is possible to use a conventional gas exchange valve because the coupling of the gas exchange valve to the valve spring is also provided with circumferential grooves in the vicinity of the shaft of the gas exchange valve. Another advantage of the connection according to the invention lies in the fact that it has a very small number of components, which simplifies production and assembly as well as repairs. Furthermore, in the connection according to the invention, it is possible to rotate the gas exchange valve in the same manner as in conventional internal combustion engines.

In order to increase the forces that can be transmitted between the actuator and the gas exchange valve, the shaft can be provided with a number of circumferential grooves spaced apart from one another in the longitudinal direction. Correspondingly, the bore has a number of beads spaced apart from one another in the longitudinal direction.

In one variant of the invention, the shaft is embodied in a cylindrical shape in the vicinity of the at least one circumferential groove and the bore is embodied in a cylindrical shape, so that the object can be attained in a particularly simple manner from a production engineering standpoint. As an alternative, the shaft in the vicinity of the at least one circumferential groove and the bore can be embodied in the shape of a truncated cone.

Other enhancements of the invention provide for embodying the at least one circumferential groove with a semicircular, rectangular, or trapezoidal cross-section, thus allowing an optimal variant to be selected depending on the requirements with regard to production, assembly, and the forces to be transmitted.

A securing element can be provided in order to prevent the connection according to the invention from becoming detached during operation.

In another variant of the invention, the securing element is embodied as an open wire ring and the coupling piece has at least one groove on its outer surface to accommodate the securing ring, so that the connection is secured by sliding the wire ring into the groove.

In another embodiment of the invention, the securing element is embodied as a nut and the coupling piece has an external thread on its outer surface, which cooperates with the nut, so that screwing the nut onto the external thread prevents the connection according to the invention from becoming detached.

In a further enhancement of the invention, the securing element can be embodied as a sleeve that can be slid over the coupling piece. It is also possible for the sleeve and coupling piece to be pressed against each other in the assembled state and to thus form a force fit. In this embodiment, which is very simple from a production engineering standpoint, the securing element can be effectively prevented from coming off the coupling piece during operation and, moreover, the fact that a specific tool is required to produce a press-fit connection ensures that only authorized garages can perform repairs to the actuator and/or the gas exchange valve.

In order to simplify assembly, it is possible for the coupling piece to be spread out in the vicinity of the at least one bead in relation to the mounted state and for the coupling piece to be pressed together by the securing element during assembly. In contrast to the exemplary embodiments described above, the connection between the gas exchange valve and the actuator in this variant is not embodied as a snap connection, but rather the positive engagement is produced only when the coupling piece is pressed together and the securing element is subsequently slid into place.

According to the invention, the shaft is part of the gas exchange valve and the coupling piece is part of the actuator. However, it is also possible for the coupling piece to be part of the gas exchange valve and for the shaft to be part of the actuator. Finally, it is also possible to couple a gas exchange valve, which is embodied as a through valve, to the actuator using the connection according to the invention.

BRIEF DESCRIPTION OF THE DRAWINGS

The foregoing and other objects and advantages of the invention will become apparent from the description combined herein below, taken in conjunction with the drawings, in which:

FIG. 2 shows a full view of a second exemplary embodiment of a connection according to the invention with a through valve; and FIGS. 3 to 6 show detailed views of various exemplary embodiments of the connection according to the invention.

DESCRIPTION OF THE PREFERRED EMBODIMENTS

Figure 1:
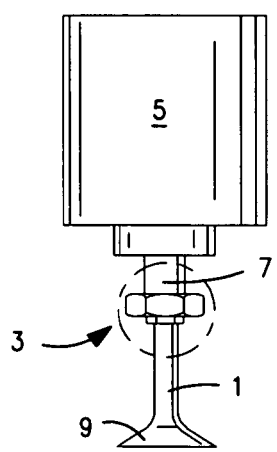
FIG. 1 shows a full view of a first exemplary embodiment of a connection according to the invention with the short shaft of the gas exchange valve.

FIG. 1 shows a gas exchange valve 1, which is coupled to an actuator 5 by way of a connection 3. A control element 7 of the actuator 5 executes the control movements that are to be transmitted to the gas exchange valve 1 by way of the connection 3. Not shown in FIG. 1 is a valve seat in a cylinder head of the internal combustion engine, which is also not shown, against which valve seat a valve head 9 of the gas exchange valve 1 rests when it is in the closed state. The connection 3 will be described in greater detail below in conjunction with FIGS. 3 to 6.

FIG. 2 shows a gas exchange valve 1 that is embodied as a so-called "through valve," which protrudes through the actuator 5 with its shaft 11 and in which the control element 7 is disposed on the end of the actuator 5 oriented away from the valve head 9.

Figure 3:
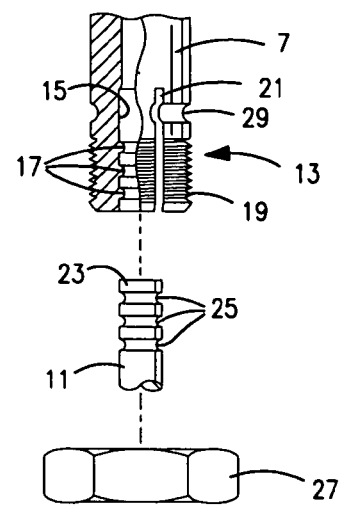

FIG. 3 shows a first exemplary embodiment of a connection 3 according to the invention in a detailed exploded view. A coupling piece 13, which is connected to the control element 7 of the actuator 5, is shown in FIG. 3 in a partially sectional view. The coupling piece 13 has a cylindrical bore 15. In the bore 15, three beads 17 are provided spaced apart from one another in the longitudinal direction of the bore 15.

There is an external thread 19 on the outer diameter of the coupling piece 13. The coupling piece 13 has multiple slits in the longitudinal direction. Only one slit 21 can be seen in FIG. 3. The slits 21 can be clearly seen in FIGS. 4 and 5.

A shaft 11 of a gas exchange valve 1 is shown below the coupling piece 13. A number of circumferential grooves 25 are disposed at one end 23 of the shaft 11 oriented away from the valve head (not shown in FIG. 3). The dimensions and spacing of the circumferential grooves 25 apart from one another correspond to the dimensions and spacing of the beads 17 in the bore 15 of the coupling piece 13.

If the shaft 11 is now slid into the bore 15 from below, the coupling piece 13 spreads open, which is easily possible because of the slits 21. As soon as the shaft 11 has reached a position in which the beads 17 engage in detent fashion in the circumferential grooves 25, the coupling piece 13 returns to its original shape and a positive engagement is produced between the beads 17 of the coupling piece 13 and the circumferential grooves 25 of the shaft 11. The circumferential grooves 25 can have a semicircular, rectangular, or trapezoidal cross-section. It is also conceivable for the flanks of the circumferential grooves 25 to enclose various angles with the longitudinal axis if, for example, the forces to be transmitted are different for opening and closing the gas exchange valve. It is also possible to provide the coupling piece 13 on the gas exchange valve 1 and the circumferential grooves 25 on the control element 7.

In order to prevent the positively engaging connection between the coupling piece 13 and the shaft 11 from becoming detached during operation, after the shaft 11 is inserted into the bore 15, a nut 27 is screwed onto the external thread 19 of the coupling piece and tightened. It is recommended that the external thread 19 and the nut 27 be embodied with a fine thread, so as to reliably prevent the nut 27 from coming loose. Naturally, any of the known screw locking devices can also be used to prevent the nut 27 from unintentionally coming loose.

Above the external thread 19 on the coupling piece 13, a recess 29 is provided, which makes it easier for the coupling piece 13 to spread open.

Figure 4:
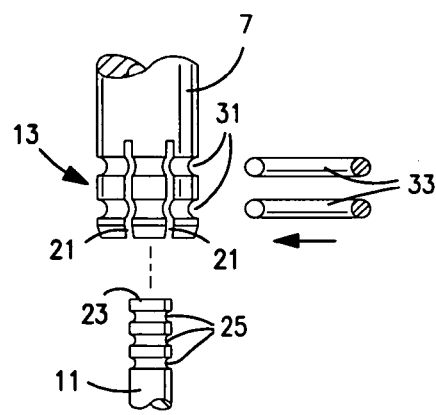

FIG. 4 shows a second exemplary embodiment of a connection according to the invention, likewise in an exploded view. The inner contour of the coupling piece 13 corresponds to the inner contour of the coupling piece 13 according to the exemplary embodiment shown in FIG. 3 and is not visible in FIG. 4. The shaft 11 with multiple circumferential grooves 25 spaced apart from one another is embodied exactly the same as explained in the exemplary embodiment shown in FIG. 3.

The slits 21, which make it easier for the coupling piece 13 to spread open when the shaft 11 is inserted into the coupling piece 13, are clearly visible in FIG. 4. The number of the slits 21 can be selected as needed.

Two grooves 31 are let into the outer circumference of the coupling piece 13 according to the exemplary embodiment shown in FIG. 4. When the shaft 11 has been inserted into the coupling piece 13, two securing rings 33 are placed over the coupling piece 13 and inserted into the grooves 31. The securing rings 33 can be embodied as open wire rings. The securing rings 33 are dimensioned and produced in such a way that they press the coupling piece together when they are placed in the grooves 31. This simply and effectively prevents an undesired detachment of the connection between the coupling piece 13 and the shaft 11.

Figure 5:
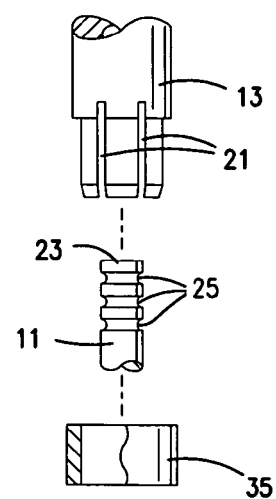

FIG. 5 shows another exemplary embodiment of a connection according to the invention between the coupling piece 13 and the shaft 11. The contour of the bore in the coupling piece 13, which is not visible, also corresponds to the contour of the bore 15 according to the exemplary embodiment shown in FIG. 3 The coupling piece 13 is embodied in the shape of a cylinder in the vicinity of the slits 21. When the shaft 11 is inserted into the coupling piece 13, a sleeve 35 is slid over the coupling piece 13 in the vicinity of the slits 21. The sleeve 35 is shown in FIG. 5 in a partially sectional view. Once it is slid on, a force fit is formed between the coupling piece 13 and the sleeve 35 such that the sleeve 35 fits snugly and securely on the coupling piece 13. As an alternative, the sleeve 35 can be compressed onto the coupling piece 13 after being slid into place.

FIG. 6 shows another exemplary embodiment of a connection according to the invention. In this exemplary embodiment, the shaft 11 is slid through the control element 7 and the coupling piece 13 from beneath. The coupling piece 13 is shown in a partially sectional view. The coupling piece 13 spreads out in the vicinity of the beads 17 far enough to permit the shaft 11 to freely slide through the bore 15 into its installation position. Then the coupling piece 13 is pressed together so that the beads 17 engage in detent fashion in the circumferential grooves 25, and a sleeve 35 can be slid onto it from above. A relief groove 37 is provided in the bore 15, which makes it easier for the coupling piece 13 to spread out and be pressed together.

Naturally, all other types of securing elements, such as the securing rings 33 or the nut 27, for example, can also be used in the embodiments of the coupling piece 13 in which the coupling piece is spread out. Nor is the spreading out of the coupling piece 13 limited to the use of through valves; it can also be used in a configuration according to FIG. 1.

The foregoing relates to preferred exemplary embodiments of the invention, it being understood that other variants and embodiments thereof are possible within the spirit and scope of the invention, the latter being defined by the appended claims.

The invention claimed is:

1. A connection of a gas exchange valve of an internal combustion engine to an actuator capable of moving the gas exchange valve in an opening and a closing direction, the connector comprising:
    a shaft (11) formed as a part of one of either the gas exchange valve (1) or the actuator,
    a coupling piece (13) formed as a part of the other of either the gas exchange valve (1) or the actuator,
    at least one circumferential groove (25) on the shaft (11),
    the coupling piece (13) having a bore (15) whose diameter when assembled corresponds to the diameter of the shaft (11),
    the bore (15) having at least one circumferential bead (17), which can be connected in a positively engaging manner to the at least one circumferential groove (25), and
    the coupling piece (13) having at least one slit (21) in the longitudinal direction of the coupling piece (13) in the vicinity of the bead (17).

2. The connection according to claim 1, wherein the shaft (11) comprises a number of circumferential grooves (25) spaced apart from one another in the longitudinal direction of the shaft (11), and the bore (15) comprises a number of beads (17) spaced apart from one another in the longitudinal direction.

3. The connection according to claim 1, wherein the shaft (11) is embodied in a cylindrical shape in the vicinity of the at least one circumferential groove (25), and wherein the bore (15) is embodied in a cylindrical shape.

4. The connection according to claim 2, wherein the shaft (11) is embodied in a cylindrical shape in the vicinity of the at least one circumferential groove (25), and wherein the bore (15) is embodied in a cylindrical shape.

5. The connection according to claim 1, wherein the shaft (11) is embodied in the shape of a truncated cone in the vicinity of the at least one circumferential groove (25), and wherein the bore (15) is embodied in the shape of a truncated cone.

6. The connection according to claim 2, wherein the shaft (11) is embodied in the shape of a truncated cone in the vicinity of the at least one circumferential groove (25), and wherein the bore (15) is embodied in the shape of a truncated cone.

7. The connection according to claim 1, wherein the at least one circumferential groove (25) has a semi-circular, rectangular, or trapezoidal cross-section.

8. The connection according to claim 1, further comprising a securing element, which prevents the connection from the shaft (11) and the coupling piece (13) from becoming detached.

9. The connection according to claim 2, further comprising a securing element, which prevents the connection from the shaft (11) and the coupling piece (13) from becoming detached.

10. The connection according to claim 3, further comprising a securing element, which prevents the connection from the shaft (11) and the coupling piece (13) from becoming detached.

11. The connection according to claim 5, further comprising a securing element, which prevents the connection from the shaft (11) and the coupling piece (13) from becoming detached.

12. The connection according to claim 8, wherein the securing element is embodied as a wire ring (33) and wherein the coupling piece (13) has at least one groove (31) on its outer surface to accommodate the wire ring (33).

13. The connection according to claim 8, wherein the securing element is embodied as a nut (27) and wherein the coupling piece (13) has an external thread (19) that cooperates with the nut (27).

14. The connection according to claim 8, wherein the securing element (33) is embodied as a sleeve (35) and wherein the sleeve (35) can be slid over the coupling piece (13).

15. The connection according to claim 14, wherein the sleeve (35) and the coupling piece (13) constitute a force fit when assembled.

16. The connection according to claim 8, wherein the coupling piece (13) is spread open in the vicinity of the at least one bead (17) in comparison to the assembled state, and wherein the coupling piece (13) is pressed together by the securing element (27, 33, 35).

17. The connection according to claim 15, wherein the coupling piece (13) is spread open in the vicinity of the at least one bead (17) in comparison to the assembled state, and wherein the coupling piece (13) is pressed together by the securing element (27, 33, 35).

18. The connection according to claim 1, wherein the shaft (11) is part of the gas exchange valve (1) and wherein the coupling piece (13) is part of the actuator (5).

19. The connection according to claim 1, wherein the coupling piece (13) is part of the gas exchange valve (1) and wherein the shaft (11) is part of the actuator (5).

* * * * *